(12) United States Patent
Wang

(10) Patent No.: US 8,927,131 B2
(45) Date of Patent: *Jan. 6, 2015

(54) BATTERY THERMAL INTERFACES WITH MICROENCAPSULATED PHASE CHANGE MATERIALS FOR ENHANCED HEAT EXCHANGE PROPERTIES

(75) Inventor: Xiaohui Jasmine Wang, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 169 days.

This patent is subject to a terminal disclaimer.

(21) Appl. No.: 13/175,191

(22) Filed: Jul. 1, 2011

(65) Prior Publication Data
US 2012/0258337 A1 Oct. 11, 2012

Related U.S. Application Data

(60) Provisional application No. 61/472,701, filed on Apr. 7, 2011.

(51) Int. Cl.
| | |
|---|---|
| *H01M 10/50* | (2006.01) |
| *H01M 10/0525* | (2010.01) |
| *H01M 10/613* | (2014.01) |
| *H01M 10/625* | (2014.01) |
| *H01M 10/6551* | (2014.01) |
| *H01M 10/6555* | (2014.01) |
| *H01M 10/6569* | (2014.01) |
| *B60L 3/00* | (2006.01) |
| *B60L 11/18* | (2006.01) |

(52) U.S. Cl.
CPC ...... *H01M 10/0525* (2013.01); *H01M 10/5004* (2013.01); *H01M 10/5016* (2013.01); *H01M 10/5046* (2013.01); *H01M 10/5055* (2013.01); *H01M 10/5079* (2013.01); *B60L 3/0046* (2013.01); *B60L 11/1874* (2013.01); *B60L 11/1875* (2013.01); *H01M 2220/20* (2013.01); *B60L 11/1877* (2013.01); *B60L 2240/545* (2013.01); *Y02E 60/122* (2013.01); *Y02T 10/7005* (2013.01); *Y02T 10/705* (2013.01); *Y02T 10/7011* (2013.01)
USPC ........................................................ 429/120

(58) Field of Classification Search
CPC .................... H01M 10/5089; H01M 10/5016; H01M 10/5046; H01M 10/5055; H01M 10/5079
USPC ........................................................ 429/120
See application file for complete search history.

(56) References Cited

U.S. PATENT DOCUMENTS

| | | | |
|---|---|---|---|
| 4,797,160 A | * | 1/1989 | Salyer ........................... 106/660 |
| 5,804,297 A | * | 9/1998 | Colvin et al. ................. 428/327 |

(Continued)

OTHER PUBLICATIONS

Kenisarin, et al., Solar Energy Storage Using Phase Change Materials, Renewable & Sustainable Energy Reviews 11 (2007), pp. 1913-1965, Durham, UK.

(Continued)

*Primary Examiner* — Nicholas P D'Aniello
(74) *Attorney, Agent, or Firm* — Dinsmore & Shohl LLP

(57) ABSTRACT

A battery module with microencapsulated phase change materials as an automotive thermal management system. In one form, the microencapsulated phase change material is in the form of a foam made of a core encased in a generally polymer-based shell. In a more particular form, the foamed material may be tailored to go through isothermal phase change at more than one temperature, such as a relatively cold temperature and a relatively high temperature. A thermal management system based on the use of such microencapsulated phase change material includes heating and cooling capabilities for conditions expected to be encountered under both high-temperature and low-temperature vehicular operating conditions. Methods of controlling the temperature in battery modules are also described.

13 Claims, 6 Drawing Sheets

(56) References Cited

U.S. PATENT DOCUMENTS

| | | | |
|---|---|---|---|
| 2002/0064692 A1* | 5/2002 | Johnson | 429/11 |
| 2006/0063066 A1* | 3/2006 | Choi et al. | 429/120 |
| 2006/0231233 A1 | 10/2006 | Farid et al. | |
| 2008/0078542 A1 | 4/2008 | Gering et al. | |
| 2008/0090137 A1* | 4/2008 | Buck et al. | 429/120 |
| 2011/0045333 A1* | 2/2011 | Kim et al. | 429/120 |

OTHER PUBLICATIONS

Final Office Action dated May 16, 2013 pertaining to U.S. Appl. No. 13/175,225, filed Jul. 1, 2011.

Final Office Action dated May 16, 2013 pertaining to U.S. Appl. No. 13/175,483, filed Jul. 1, 2011.

Non-Final Office Action dated Feb. 15, 2013 pertaining to Utililty U.S. Appl. No. 13/175,225, filed Jul. 1, 2011.

* cited by examiner

BATTERY THERMAL INTERFACES WITH MICROENCAPSULATED PHASE CHANGE MATERIALS FOR ENHANCED HEAT EXCHANGE PROPERTIES

CROSS-REFERENCE TO RELATED APPLICATIONS

This application claims the benefit of U.S. Provisional Application Ser. No. 61/472,701, filed Apr. 7, 2011.

BACKGROUND OF THE INVENTION

This invention relates generally to passive thermal management of batteries and portions thereof, and more particularly to the use of microencapsulated phase change materials in conjunction with automotive battery packs, battery modules or individual battery cells as a way to improve thermal management of such battery components.

Lithium-ion batteries are being used in automotive applications as a way to supplement, in the case of hybrid electric vehicles (HEVs), or supplant, in the case of purely electric vehicles (EVs), conventional internal combustion engines (ICEs). In either variant, HEVs or PEVs belong to a larger class of vehicles known as electric vehicles (EVs). The high volumetric heat generation rate and generally passive construction of lithium-ion batteries provides both the durability and functionality needed to serve as a propulsion system for cars, trucks, buses, motorcycles and related automotive or vehicular platforms.

Temperature is one of the most significant factors impacting both the performance and life of a battery. Extremes (such as those encountered during protracted periods of inactivity in cold or hot environments, or due to extended periods of operation and concomitant heat generation on hot days) can negatively impact the ability of the battery to operate correctly, and in severe cases can destroy the battery entirely. Side effects of prolonged exposure to high temperature may include premature aging and accelerated capacity fade, both of which are undesirable. Conventional heat dissipation methods such as forced air and liquid cooling may prove to be effective at avoiding such side effects, but they add to overall vehicular system weight, complexity and parasitic power requirements.

SUMMARY OF THE INVENTION

A battery thermal management system based on a phase change material (PCM) has the potential to limit battery temperature extremes, thus acting to increase temperature uniformity, as well as to reduce heating and cooling requirements. This helps to prolong the life of heat-sensitive components, such as the charge-carrying battery cells that form the building blocks of battery modules and battery packs. PCMs can absorb and release a large amount of latent heat (in some instances up to fifty times higher than sensible heat) during isothermal (i.e., constant temperature) changes of phase, such as from solid-to-liquid or liquid-to-solid. As such, the use of PCMs can help to reduce or eliminate the need for active cooling components such as a fan, blower or pump in forced-air or forced-liquid cooling systems. This is beneficial in that the PCM can provide the ability to maintain the cell temperature in a desired temperature range without drawing power from the battery or another energy source. An example of a PCM-based approach to battery thermal management may be found in a co-pending U.S. patent application Ser. No. 13/175,483 entitled BATTERIES WITH PHASE CHANGE MATERIALS which was filed on the same day as the present application, owned by the Assignee of the present invention and hereby incorporated in its entirety by reference.

According to one aspect of the invention, a battery pack employing one or more battery modules which in turn employ one or more battery cells is disclosed. More particularly, a microencapsulated version of a PCM-based thermal management system is used to provide at least one of augmented heating or cooling to a configuration of such battery components. This version, known as a microPCM, is made up of very small bi-component particles or capsules that include a core material that exhibits latent heat changes tailored to a temperature range typically countered in an automobile battery pack, along with an outer shell or capsule made from a polymer or related material such that together, the core and shell define a generally spherical foam-like material. MicroPCM capsules range from less than one micron to several hundred microns in diameter, where all three states of matter (solids, liquids and gases) may be used to form the microencapsulatable core. Advantages compared to non-microencapsulated PCM includes increased protection of the core material, ease of incorporation into other materials, and decreased likelihood of leakage during melting. MicroPCMs may also be mixed in different mass percentages as a way to tailor their thermal response, for example, adjusting the phase change latent heat and phase change temperature. They can also be made to have more than one material be formed in the core such that each microPCM exhibits a thermal composite structure. Additional advantages include low material costs, where microencapsulation can include between about 50 and 90 percent active material.

In a particular form, the battery pack is made up of numerous battery modules each of which is in turn made up of one or more battery cells that may deliver electric current for motive power for an automobile. In the present context, the term "motive power" describes a battery pack capable of providing more than mere starting power for another power source (such as an internal combustion engine); it includes battery packs capable of providing sustained power sufficient to propel a vehicle in a manner consistent with that for which it was designed. In one form, the current generated by the battery pack may be used to run one or more electric motors that in turn may be used to turn one or more wheels. Other members (for example, structural members) are placed in thermal communication with the battery cell to enable heat exchange between them. The member includes a microPCM such that upon exposure of the microPCM to a temperature change, the microPCM's ability to absorb (in situations involving high ambient temperatures) or release (in situations involving low ambient temperatures) significant amounts of latent heat allows significant quantities of heat to be exchanged with the battery cell without (or at least a significant reduction in) the need for supplemental cooling, such as forced-air or forced-liquid convective cooling.

In one preferred form, the microPCM is made up of a two-layer structure of an outer shell containing an inner core of phase change material. In this way, a material of high latent heat absorption is protectively encased within the shell. For automotive applications, where much of the ambient temperature is between approximately −10° C. and 40° C., the material of high latent heat absorption may be made to exist in any of a sold, liquid or gaseous state some typical temperature at or within these limits. As such, in the present context, when a microPCM is mentioned as having a particular phase-change temperature (such as about −10° C. to about 40° C. generally, or a more particular value within that range, such as 37° C. (in the case of eicosane, discussed below) or a broader range, such as below about 0° C.), it will be appreciated by those skilled in the art that minor variations near these temperatures are also within the scope of the present invention so long as such variations correspond to the thermal environment in which the automobile is operating, and such environment is one that the automobile is designed for and reasonably expected to be encountered during such operation.

One particularly promising material for the core material of microPCMs is eicosane, a paraffin-based mixture of alkanes that exhibit a high latent heat of fusion (for example, about 240 kJ/kg). The melting point of eicosane, 37° C., makes it ideal for electric vehicle applications, where a typical battery cell maximum excursion temperature of between about 40° C. and 50° C. may occur. Likewise, because automotive applications (such as those with HEV or PEV configurations) may operate within the above temperature ranges, it would be desirable to have at least the high-temperature phase change temperatures take place between about 28° C. and 40° C. Such paraffin-based PCMs are an excellent electrical insulator, with an electrical resistivity of between $10^{13}$ and $10^{17}$ ohm meter. Furthermore, such a microPCM has been shown to be durable under various battery charge and discharge cycles, with particular emphasis on avoidance of microcapsule damage due to the foam compression force deflection under different battery operating temperatures. Other materials may be used, such as non-paraffin organic PCM fatty acids; however, additional tailoring may be required to have the melting or related phase change occur in temperature ranges commensurate with HEV or PEV battery pack operating temperatures. Other paraffin wax-based materials that may be suitable include octadecan, subject to the needs of the particular automotive environment. While it is additionally possible to augment the thermal conductivity of materials such as paraffin wax through the use of certain high thermal conductivity materials (for example, graphite) in the wax matrix, care must be taken, at least for automotive and related transportation applications, as graphite tends to be brittle (and therefore exhibits negative crash-related damage properties), difficult to machine, electrically conductive and expensive. Other factors (for example, leakage behavior) militate against its use as a matrix for PCM, especially for HEV or PEV applications.

In one particular configuration, the microPCM (which may embody a generally spherical shape) is approximately 20 microns in diameter Likewise, the material of high latent heat absorption used as the core may be in any of a solid, liquid or gaseous state at room temperature, so long as it retains the ability to absorb or release a significant amount of latent heat upon exposure to the respective high or low temperature from the battery pack that corresponds to at least one of an endothermic reaction absorption of heat and an exothermic reaction release of heat. In a more particular form, the member (which is preferably a part of, or provides structural support to, a heat-exchange mechanism) comprises at least one of a cooling fin, cooling plate or compressible foam isolator sheet, any or all of which can be used to provide support to the microPCM, such as by coating or otherwise placing a layer of the microPCM on an external surface. The microPCM may, in another form, be a composite, such that it is made up of a low-temperature phase change material (for example, one that is designed to go through a phase change from liquid to solid at a temperature in the range of about −10° C. to about 0° C.) and a high-temperature phase change material (for example, one that is designed to go through a phase change from solid to liquid at a temperature of about 40° C., or (in cases where higher temperature latent heat of vaporization is needed) between about 40° C. and 50° C.). Such a composite configuration is particularly valuable in automotive applications where time histories may reveal significantly different thermal environments. Various microPCMs can be mixed in the capsule in different mass percentages to get different phase change temperatures. For example, n-tetradecane (with melting point of 6° C.) and n-eicosane (with melting point of 37° C.) can be mixed in the capsule to limit the temperature swing between around 0° C. to around 40° C. In a variation on such composite, mixtures containing both high-temperature and low-temperature shell-and-core combinations may be used.

The thermal management system of the present invention that employs microPCM is desirably applied to a battery to reduce repeated exposure to high temperatures that could otherwise lead to premature battery aging. More particularly, microPCMs in close contact with battery cells can act as a thermal buffer that in turn may result in reduced power fade, reduced capacity fade, improved battery life and durability, reduced warranty costs, improved vehicle range and prevention of thermal runaway. Furthermore, microPCMs with different (i.e., lower) melting points can be mixed in with the high-temperature microPCM, thereby providing protection against both high and low temperatures. For example, both a low-temperature phase change material and a high-temperature phase change material may be placed within a common capsule to result in one form of a composite microPCM. Likewise, a composite microPCM may include both low-temperature core-and-shell combinations mixed in with high-temperature core-and-shell combinations. In one form, the microPCM can be formed as part of a lithium-ion or related battery cell, or be part of a structural member or related component (such as foam isolator sheet, cooling plate or cooling fin) that can be placed in thermal communication with the battery cell.

Preferably, the bulk volume of the microPCM is in the wet-cake form (i.e., a mixture of solids and water). In the present context, the wet-cake form refers to the bulk volume of the whole bi-component particles; in one preferred form, it contains about 70% solids and about 30% water. Compared to its dry-cake form, microPCM in the wet-cake form reacts fast when blended with other materials and proves to be more stable by being less susceptible to separation. The microPCM can be uniformly coated on or melt-blended with polyurethane material to form a new thermal foam isolator sheet, or formed into channels that are part of a cooling plate or cooling fin. In one advantageous form, the microencapsulation of the PCM is such that it has a high degree of temperature stability, where leakage is kept to a minimum. The high heat capacity of the microPCM, coupled with the juxtaposition of the sheet, plate or fin to which it is attached, forms the basis of a passive thermal management system that acts independently of, or as part of active or other forms of cooling as part of an integrated cooling system. Thus, even in situations where active cooling may be warranted, the use of microPCM as part of an integrated cooling scheme offers the possibility of a simplified cooling system. Moreover, the microPCM of the present invention can be used whether the cooling medium is air-based or liquid-based.

According to another aspect of the invention, an automobile includes a portion for conveying at least one of a passenger, operator or cargo, a portion for engaging a surface upon which the automobile travels and a propulsion portion for providing motive power to the surface-engaging portion. In one form, the conveying portion may be the cabin or passenger compartment of a car, truck, bus or the like, as well as a seat for a motorcycle. Similarly, the surface-engaging portion may be made up of one or more wheels used to facilitate rolling motion of the automobile over a road, track, path or related surface. Relatedly, the propulsion portion provides motive force to the wheels, and may include a battery pack that in turn includes one or more battery modules that may be made of one or more individual battery cells. As stated above, temperature management is a significant issue for batteries and their components; the present invention includes a heat exchange mechanism made up of microPCM is placed in thermal communication with the one or more battery cells. Upon exposure of the microPCM to a temperature change in the battery cell or cells, the microPCM can be made (at the appropriate temperature) to go through a phase change as a way to absorb (upon heating) or release (upon cooling) heat with the one or more cells that make up the battery pack.

Optionally, the microPCM is made up of an outer shell with an inner core of material of high latent heat absorption encased within the shell. In one form, the microPCM may include a low-temperature phase change material and a high-temperature phase change material such that the low-temperature phase change material is configured to experience a phase change from liquid to solid at a relatively low temperature, and further such that the high-temperature phase change material is configured to experience a phase change from solid to liquid at a relatively high temperature. Such relative temperatures preferably coincide with low and high temperatures that the automobile in general and the battery pack in particular may be exposed to. As discussed above, in one form, both the low-temperature and high-temperature core materials may be mixed together within a single shell, while in another, each may be retained autonomously within their own respective shells. This latter configuration permits the judicious placement of tailored-temperature microPCMs based on the expected local thermal environment.

According to yet another aspect of the invention, a method of controlling temperature in a battery pack is disclosed. The method includes arranging a microPCM to be in thermal communication with a battery cell such that upon change to the cell's temperature, an exchange of heat takes place between the cell and the microPCM, where at least a portion of the heat exchange between them takes place during the phase change within the core of the microPCM. In a particular form of the exchange, the phase change comprises having the microPCM convert from substantially liquid form to substantially solid form at a temperature of less than about 0° C. Likewise, phase change comprises having the microPCM convert from substantially solid form to substantially liquid form at a temperature of greater than about 40° C. In other forms, the phase change temperature may be tailored to occur at other temperature regimes deemed important to the operation of the battery cells, depending on the configuration, use environment or related operating condition for the battery; it will be appreciated that such other temperature ranges are within the scope of the present invention. In another option, the microPCM may be made from numerous phase change materials; in this way, a first microPCM may be used in situations where the battery pack (or relevant portions thereof) is exposed to a low-temperature, while a second microPCM may be used in situations where it is exposed to a high-temperature. As previously mentioned, such a configuration (i.e., with both low-temperature and high-temperature capabilities) may be thought of as a composite PCM system. As discussed in conjunction with the previous embodiment, the microPCM is made up of an outer shell with an inner core of material of high latent heat absorption encased within the shell, where the core may contain one or both the low-temperature and high-temperature phase change materials as part of one form of the aforementioned composite structure. In yet another option, the microPCM is placed in compressible contact with a surface of the battery cell, such as through the aforementioned foam isolator sheet, where the combination of microPCM with a polyurethane or related substrate exhibits elastic, foam-like properties. This (and other direct) contact ensures ample opportunity for thermal communication between the microPCM and the heat present in the heat-generating portions of the battery. As also previously discussed, the microPCM may form part of a surface of a cooling plate (more particularly, being placed within one or more channels formed in the surface of the plate) or a cooling fin.

DETAILED DESCRIPTION

Figure 1:
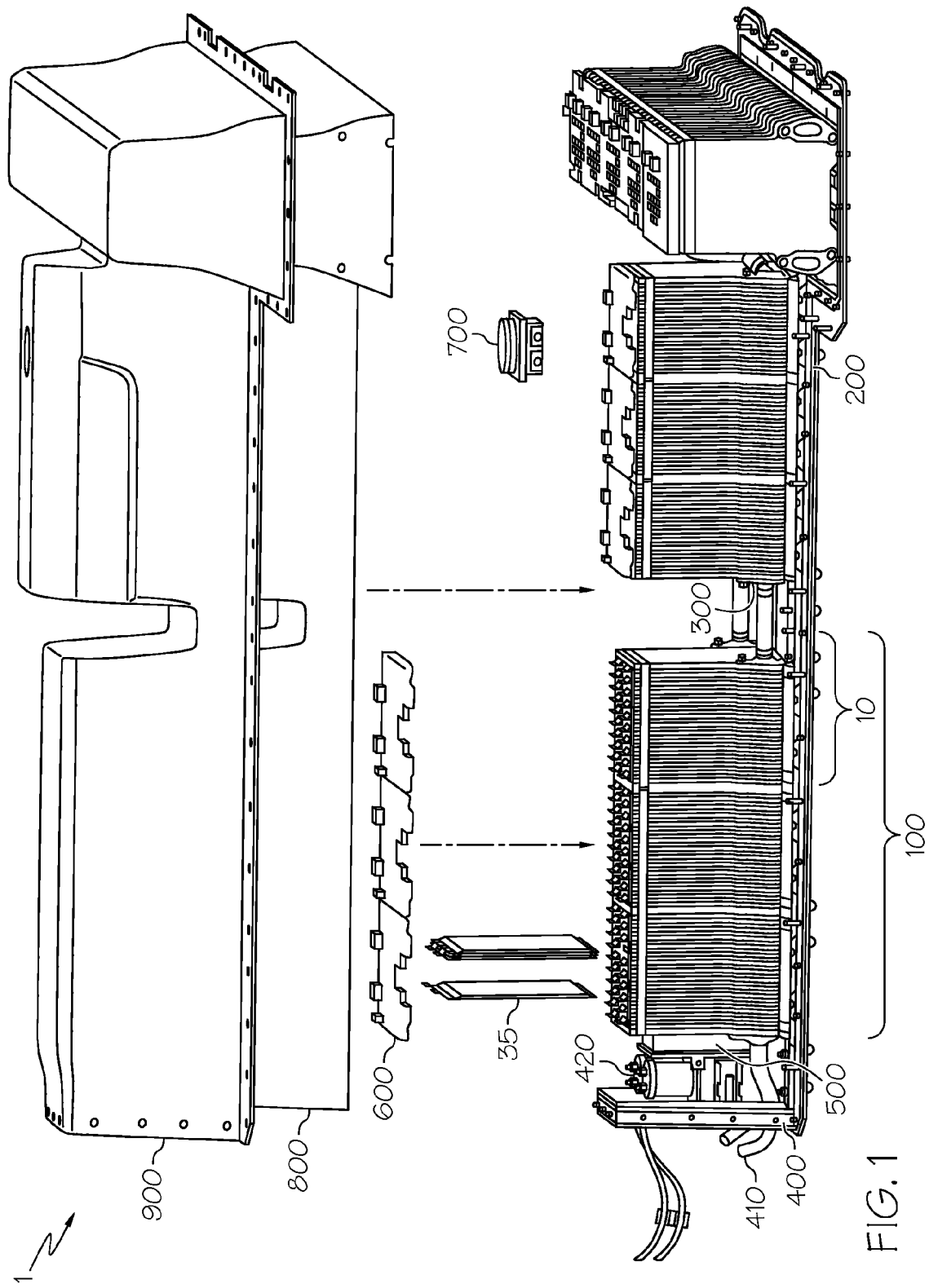
FIG. 1 shows a vehicular propulsion system in the form of a battery pack.

Referring first to FIG. 1, a vehicular propulsion system in the form of a battery pack 1 employing numerous battery modules 10 is shown in a partially-exploded view. Depending on the power output desired, numerous battery modules 10 may be combined as a group or section 100; such may be aligned to be supported by a common tray 200 that can also act as support for coolant hoses 300 that can be used in configurations where supplemental cooling may be desired. A bulkhead 400 may define a primary support structure that can function as an interface for the coolant hoses 300, as well as house a battery disconnect unit in the event battery service is required. In addition to providing support for the numerous battery modules 10, tray 200 and bulkhead 400 may support other modules, such as a voltage, current and temperature measuring module 500. Placement of individual battery cells 35 (to be discussed in more detail below) within one of battery modules 10 is shown, as is the covering thereof by a voltage and temperature sub-module 600. In one typical example, battery pack 1 may about two hundred individual battery cells 35. Other features, such as manual service disconnect 700, insulation 800 and a cover 900 complete the battery pack 1.

In addition to the aforementioned battery disconnect unit, other power electronic components may be used for section 100, including a battery management system or related controllers. In conventional form involving liquid-cooled battery packs, such electronic components are not cooled, despite being located very close to the numerous battery modules 10. As a result, they may heat up nearby modules 10, thereby creating non-uniform degradation of the cells 35 and a concomitant imbalance between them. Since most of these power electronic components are located on the top and end of the battery module 10, microPCM of the present invention placed on cooling plates between such components and the cells 35 of the battery modules 10 can act as heat sinks to absorb and subsequently dissipate the heat generated convectively through air-based or liquid-based means.

Figure 2:
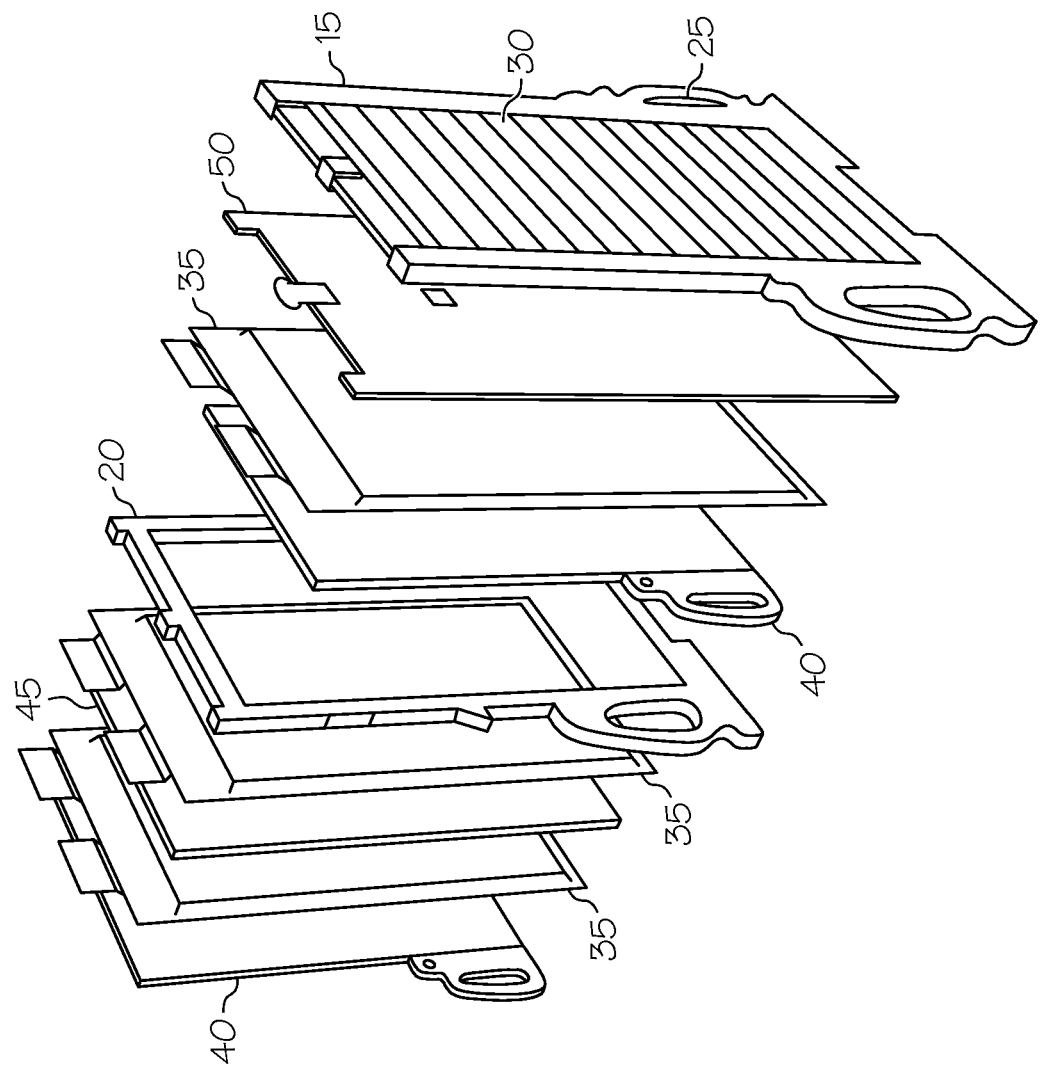
FIG. 2 is an exploded view of one embodiment of a portion of a battery module that makes up the battery pack of FIG. 1, where the module includes liquid cooling.

Referring next to FIG. 2, one embodiment of a portion of a battery module 10 for use in conjunction with a liquid cooling-based system is shown in an exploded view. In order to form the module 10, at least some of the components discussed below may be arranged in a repeating stack-like manner. End frame 15 and repeating frame 20 form the basis for the structure of the battery module 10, where the end frame 15 can have an edge portion 25 surrounding a cooling plate 30 that may include ribs for added stability, while each repeating frame 20 may serve to both provide a secure mounting position for a corresponding cell 35. As such, both the cooling plate 30 (where the microPCM may be formed into channels that are part of a cooling plate) and a foam isolator sheet 45 (where the microPCM can be uniformly coated on or melt-blended with polyurethane material to form the foam) may be used as a way to provide passive heat transfer to or from the battery cells 35. Furthermore, liquid-bearing cooling fins 40 may be placed in thermal communication with the battery cells 35 as a way to further augment heat capacity and subsequent heat transfer; their proximity to a corresponding one of repeating frames 20 allows for a convenient securing location in a manner generally similar to that of cells 35. In a particular embodiment of the present invention, any or all of cooling plate 30, cooling fins 40 and foam isolator sheet 45 may have the microPCM applied, adhered or otherwise affixed to a surface thereof in order to provide the desired thermal interfaces with beneficial enhanced heat exchange capabilities. With particular regard to the cooling fins 40, liquid coolant can be made to flow through one or more generally serpentine fluid-conveying channels or flowpaths, while the microPCM may be disposed on a surface placed against these flowpaths in order to maximize surface area contact and concomitant heat transfer Likewise, the cooling plates 30 (which may be mounted to end frame 15) may include channels formed in the generally planar surface thereof to allow the placement of microPCM therein; as with the cooling fins 40, the cooling plates 30 present a relatively large area as a contact surface to augment heat transfer to or from the battery cells 35. The end frames 15 and repeating frames 20 are typically made of a light-weight, non-conductive material, such as plastics (for example, polypropylene, nylon 6-6) and other low-cost materials. The frames 15, 20 can be fiber-reinforced for structural strength, if desired. With particular regard to the foam isolator sheet 45, the microPCM may be disposed on a substrate (such as the aforementioned polyurethane) that makes up the foam isolator sheet 45. With particular regard to the cooling plate 30, the microPCM may be formed as part of a wet cake or other semi-solid form such that it can be deposited in the between-rib recesses formed in the surface of the plate. In addition, an insulative sheet 50 is placed between the battery cell 35 and the cooling plate 30 to protect the battery cell 35. In a preferred form, insulative sheet 50 is made of a plastic or related material, and is affixed to cooling plate 30. One or more thermistors (not shown) are situated between the insulative sheet 50 and the cooling plate 30 to monitor battery cell 35 temperature. In a battery module 10, there may be numerous thermistors, for example, one for each insulative sheet 50/cooling plate 30/battery cell 35 interface. Additional components, such as pack plates, voltage inner connect boards or the like (many of which are shown in conjunction with an alternate embodiment discussed below in conjunction with FIGS. 6A and 6B) are used to help form the assembled battery module 10.

The use of microPCMs in a liquid coolant is discussed in more detail in co-pending U.S. patent application Ser. No. 13/175,225 entitled LIQUID COOLANT WITH MICROENCAPSULATED PHASE CHANGE MATERIALS FOR AUTOMOTIVE BATTERIES, which was filed on the same day as the present application, owned by the Assignee of the present invention and hereby incorporated in its entirety by reference.

The nature of the microPCM is that it has high latent heat of absorption and reversible thermal regulation properties. In this way, when used as part of foam isolator sheet 45, cooling plate 30, cooling fin 40 or other structural member within battery module 10 that is in need of augmented heat transfer properties, the microPCM can act as a thermal capacitor which can passively buffer temperature extremes in battery module 10. This promotes a reduction in battery module 10 parasitic losses, thereby allowing optimization of battery module 10 energy usages, as well as reduction of active cooling system use and complexity. In situations where more than one member or component, operating at more than one temperature regime, may require the use of the microPCM of the present invention, it will be appreciated by those skilled in the art that the makeup of both the core and shell may be tailored to such particular temperature regimes. In such circumstance, the cooling fin 40 may be configured to include a layer of material (such as foam, or a related substance) that can contain a microPCM that operates in a different temperature regime than that of a microPCM that may be placed in or on the foam isolator sheet 45 or cooling plate 30. In such tailoring circumstances, blending of various pure materials (such as alkanes) may be performed to have the phase change temperature coincide with the thermal environment of the particular automotive application. One material useful for such tailoring is n-heptadecane, which can be added to eiconsane, octadecane or related phase change material. Similar blending may be used to adjust the phase change latent heat.

One advantage of coupling the microPCM to the foam isolator sheet 45 stems from the proximity of the foam isolator sheet 45 to the heat-generating cells 35. In this way, the microPCM absorbs heat generated by the cells 35 of the battery module 10 during discharge and regenerative charging, and then dissipates the heat during vehicle rest periods or by convection heat transfer (such as air cooling) during vehicle operation. Its enhanced heat capacity and reversible thermal properties can limit battery module 10 extreme temperature swings and improve temperature uniformity, thereby promoting battery module 10 life, performance and efficient use of energy. In addition, the foam isolator sheet 45 can be easily adopted by different battery packaging designs due to its simple and flexible structure.

Figure 3:
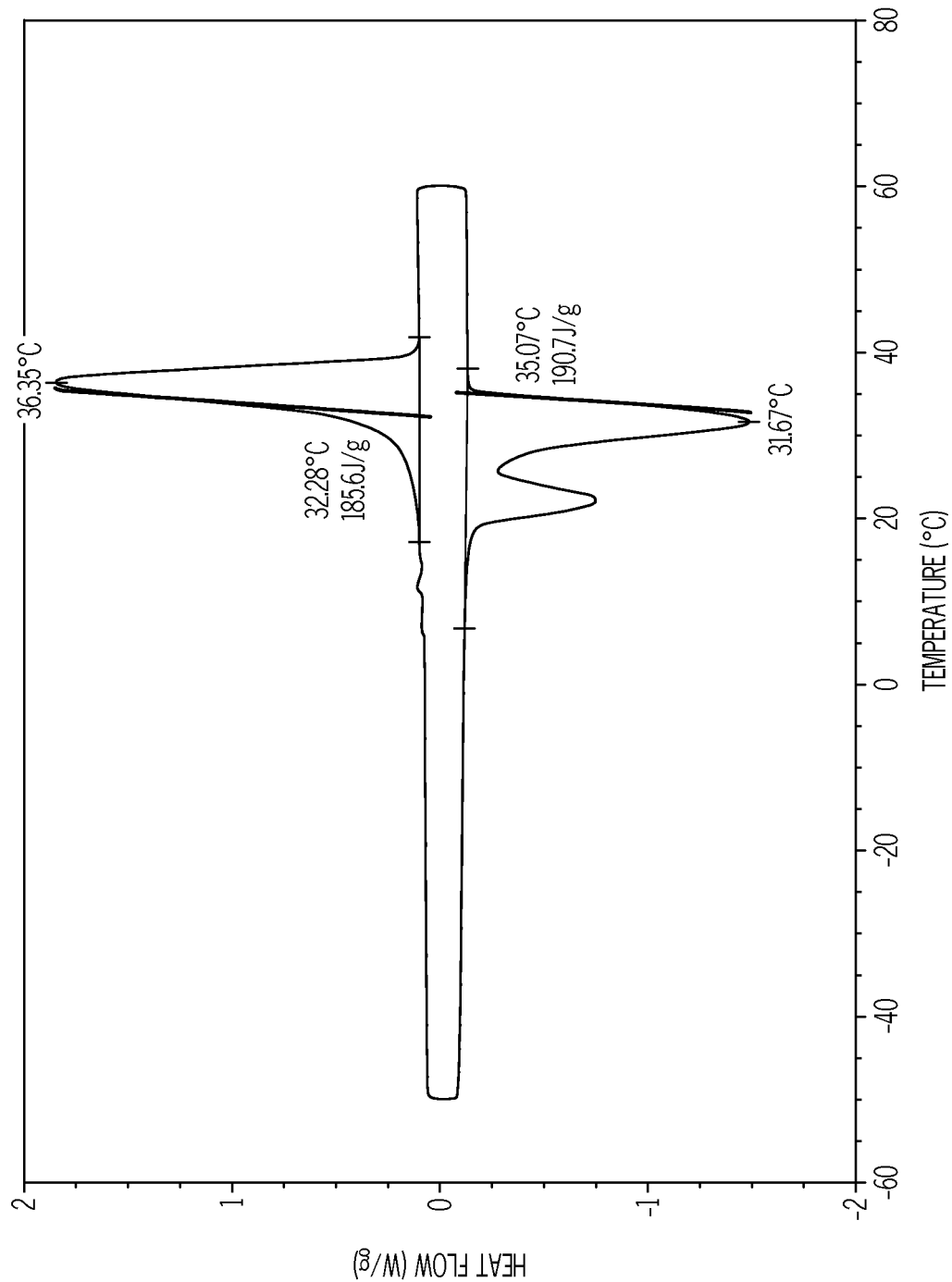
FIG. 3 is a Differential Scanning calorimetry (DSC) chart showing the phase change properties of a bulk laboratory grade microPCM that uses eicosane as the high latent heat material.

Referring next to FIG. 3, results from DSC testing are used to determine the phase change properties of bulk laboratory-grade microPCM eicosane. The scan rate used in this test was 5° C. per minute, and the temperature range was controlled from −50° C. to 80° C. The peaks indicate phase change upon heating (top) and cooling (bottom). The peak on the top curve shows the behavior of the solid-to-liquid phase change transition, while the area under the peak is the latent heat for the solid-to-liquid transition (i.e., the latent heat of fusion); in the present example, the latent heat was found to be 185.6 J/kg. This curve also indicates that liquid starts to appear at 32.28° C. and that eicosane is completely liquid at 36.35° C. Likewise, the peaks on the bottom together show the behavior of the liquid-to-solid phase change transition, where the left peak shows the liquid-to-liquid phase change transition associated with eicosane, while the right peak shows the liquid-to-solid phase change transition. The area under these peaks is the latent heat for the solid-to-liquid transition; in the present example, the latent heat was found to be 190.7 J/kg. This curve also indicates that solid eicosane starts to appear at 35.07° C. and that it is completely solid at 31.67° C.

Figure 4:
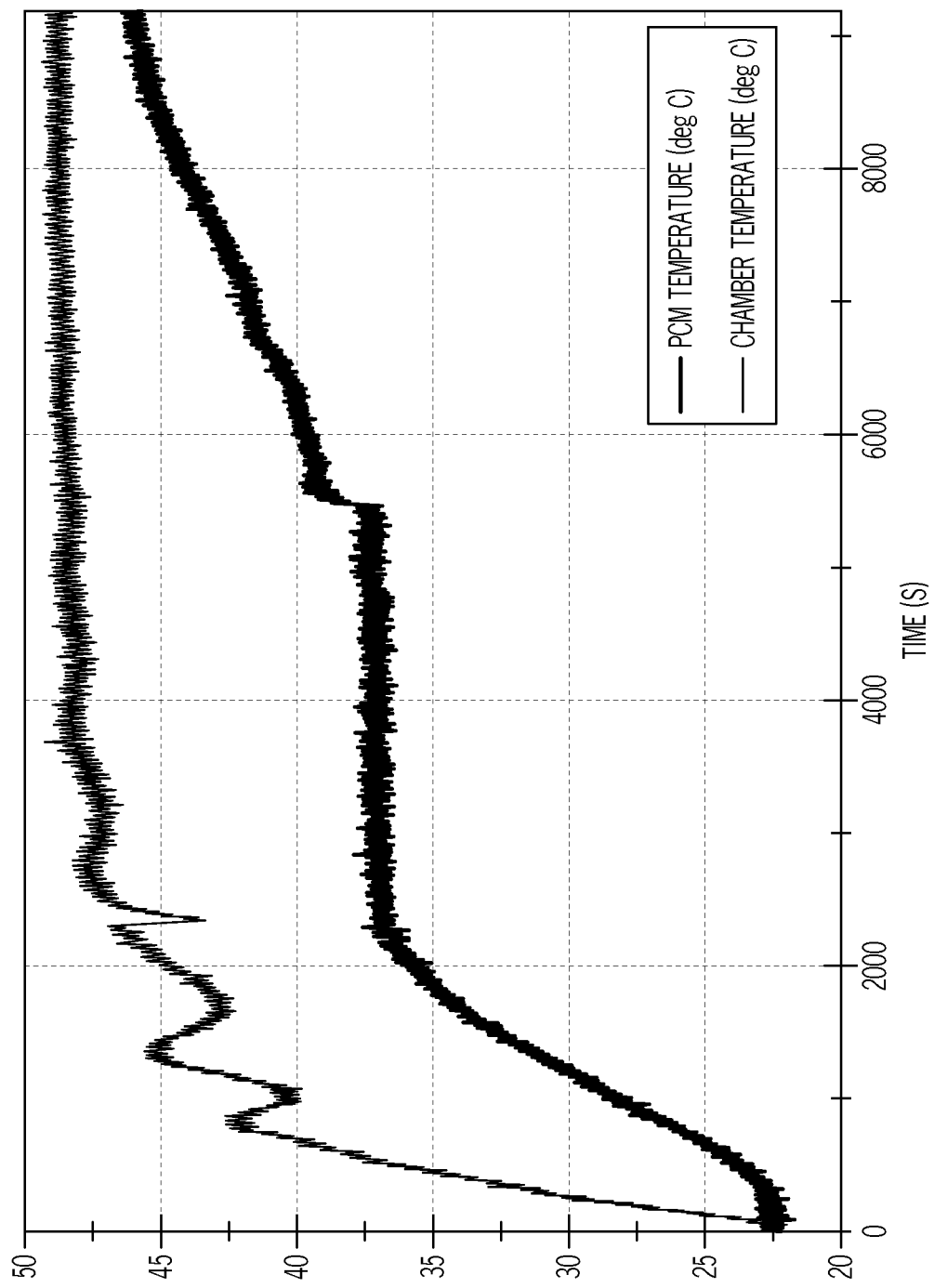
FIG. 4 is a chart showing thermal testing in an environmental chamber of a microPCM that uses eicosane as the high latent heat material.
Figure 5:
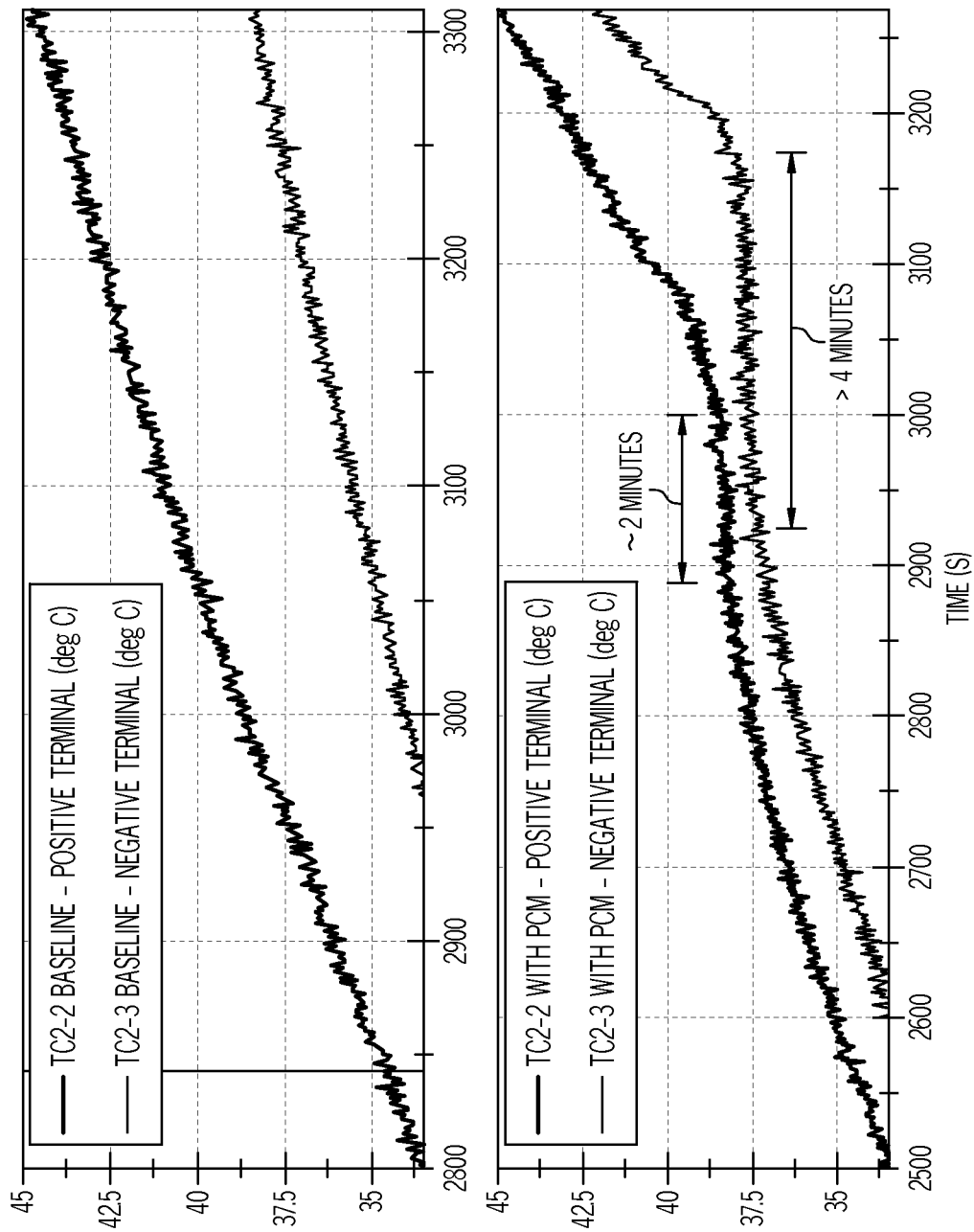
FIG. 5 shows battery cell temperature distribution when the battery section was under charge and discharge operation for both a baseline foam isolator as well as one from a foam isolator according to an aspect of the present invention.

Referring next to FIGS. 4 and 5, the results of microPCM eicosane thermal testing conducted by the present inventor is shown. In particular, the test was conducted in an environmental chamber test setup with the temperature running from 23° C. to 48° C. Referring with particularity to FIG. 4, the lower curve (which corresponds to the microPCM temperature) shows that a 12.1 gram sample of eicosane managed to stay at approximately 37° C. for about 1 hour while being heated. Referring with particularity to FIG. 5, results are shown for a battery cell temperature distribution when the tested battery section of the test setup was under charge and discharge operation. The chart on the top shows the baseline testing results with foam isolator sheets that do not have the microPCM added to them, while the chart on the bottom shows the testing results with a simulated foam isolator sheet (such as foam isolator sheets 45 of FIG. 2) incorporated with eicosane as the microPCM. Two thermocouple recordings are shown; the upper curve is the readings from the thermocouple at the location close to the positive tab of the battery cell (such as battery cell 35 of FIG. 2) and the lower one is the readings from the thermocouple at the location close to the negative tab of the battery cell 35. Test results show that the battery cell temperature was regulated between 37° C. to 38° C. with the foam isolator sheet 45 prototype of the present invention, and the temperature uniformity on the battery cell 35 was improved compared to the baseline test results.

Figure 6B:
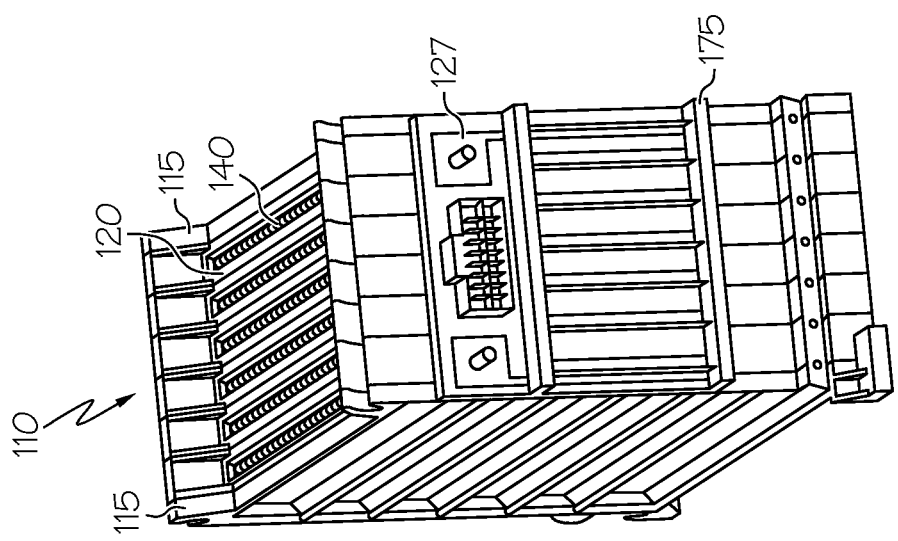
FIG. 6B shows an assembled battery module made up of multiple battery portions of FIG. 6A.
Figure 6A:
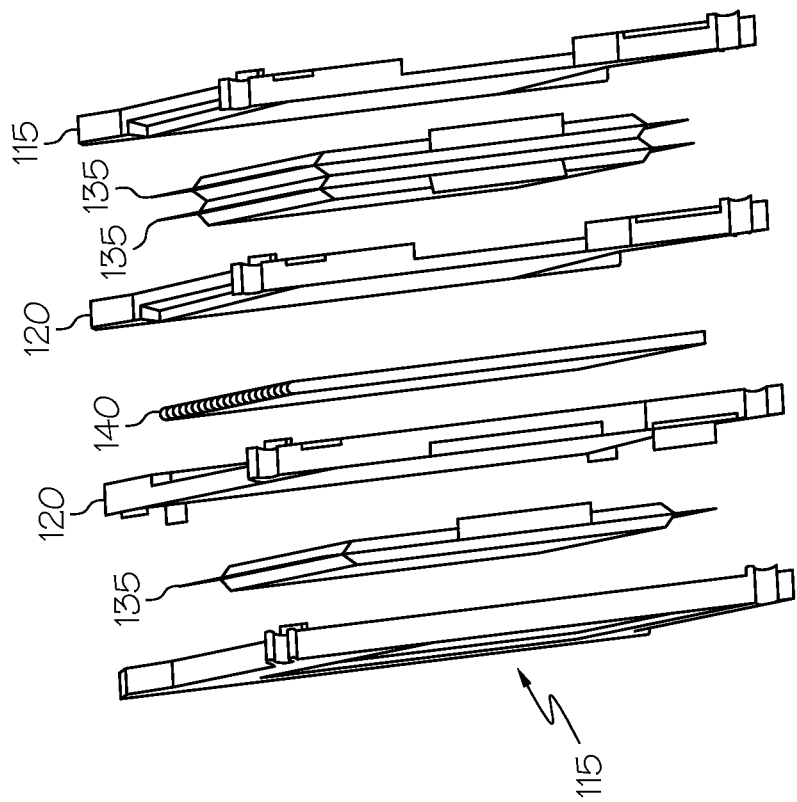
FIG. 6A shows an exploded view of a portion of a potential HEV battery module with a cooling plate with corrugated channels for air cooling.

Referring next to FIGS. 6A and 6B, a notional design is shown of an air-cooled HEV battery module 110 with the microPCM being encapsulated in the cooling fin 140 or cooling plate 130 (not presently shown, but which is contained within cell frame 115) channels, according to an aspect of the present invention. The stacking construction, as well as the structural members and battery cells 135, are generally similar to that of the liquid-cooled variant depicted in FIG. 2. Referring with particularity to FIG. 6A, pack plates 175 are used to act as edgewise outer support members for the module 110. Intermittently-spaced cell frames 120 are used to securely hold and space various battery cells 135 as well as the cooling fins 140 in a manner generally comparable to that of frames 20 discussed above in conjunction with FIG. 2. As such, the frames 115, the cell frames 120 and the pack plates 175 together cooperate to form a rigid, boxlike structure for each of the battery modules 110 Likewise, larger support structures, such as the tray 200 or bulkhead 400 mentioned above in conjunction with FIG. 1, may serve as support or mounting structure for the larger repeatable units of battery group or section 100 or battery pack 1. In one form, the cooling fins 140 are of a construction generally similar to that of cooling fins 40 shown in FIG. 2, where both may exhibit corrugated cardboard-like features with numerous parallel channels can be formed between the opposing sheets such that edge-to-edge flowpaths are defined thereby. Referring with particularity to FIG. 6B, the various components of FIG. 6A, when placed in cooperative arrangement with one another, form the assembly that defines battery module 110, where a voltage interconnect board 127 functions to hold and support the positive and negative tabs and a circuit board of the assembled battery module 110. Combined with the high heat capacity of the microPCM, high thermal conductivity of the cooling plate material such as aluminum, and heat convection by air cooling, such a design may form the basis for an effective thermal management solution for HEV battery modules. Unlike the liquid-cooled system depicted in FIG. 2 (where a liquid coolant flows through channels or flowpaths formed in cooling fin 40), the cooling fin in FIG. 6 employs forced air passage. Regardless of whether an air-cooled or liquid-cooled approach is used, the addition of microPCM as part of an integrated cooling scheme offers the possibility of a simplified cooling system even in situations where active cooling may be warranted.

Referring again to FIG. 2 (and equally applicable to a comparable construction that may be present in FIGS. 6A and 6B), the construction of the microPCM-based foam isolator sheet 45 is such that it may form a thermal composite where, as alluded to above, the microPCM exhibits its phase-changing thermal properties (whether from solid to liquid or liquid to solid, for example) at two different temperatures. Also as discussed above, this can be achieved by using various microPCMs, each with latent heat properties tailored to particular temperature regimes. In one form, one microPCM may be made to have its phase change at a low temperature limit (e.g., about −10° C. to 0° C.), and another microPCM to have a phase change at a high temperature limit (e.g., about 40° C. to 45° C.). Such dual-temperature activation helps to maintain battery cell 35 temperature for longer periods of time and over extreme temperature conditions. In situations where higher temperatures may be experienced, the PCM-based thermal management system may be coupled with an active-based system (such as that involving the circulation of a liquid coolant discussed above in conjunction with the coolant hoses 300 of FIG. 1) to augment overall system performance and reduced likelihood of catastrophic battery module 10 or section 100 failure. In one preferred form, the phase change temperatures can be tailored to coincide with the desired temperatures and large heat capacity values associated with an automotive battery module 10 that may coincide with the temperature ranges discussed above.

As mentioned above, other supplemental devices may be used. For example, cooling fins 40 can be made of any conventional cooling material, including, but not limited to, light-weight thermal conductors such as aluminum or sandwich structures of two light-weight thermal conductors separated by a layer of compressible foam or other expansion compensator to allow for expansion and contraction of the battery cells 35 on either side of the cooling fin 40 caused by the charge state, heating and cooling of the cells 35. There can be a film for electrical isolation on the cooling fin 40, if desired, such as Mylar® polyester film with electrical insulation resistance of over 100,000 MΩ-µF. In addition to the aforementioned fin 40, sheet 45 and plate 30, other heat exchange mechanisms may be employed, such as heat pipe technology.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, terms such as "substantially" are utilized to represent the inherent degree of uncertainty that may be attributed to any quantitative comparison, value, measurement, or other representation. It is also utilized to represent the degree by which a quantitative representation may vary from a stated reference without resulting in a change in the basic function of the subject matter at issue.

For the purposes of describing and defining the present invention it is noted that the term "device" is utilized herein to represent a combination of components and individual components, regardless of whether the components are combined with other components. For example, a device according to the present invention may comprise an electrochemical conversion assembly or fuel cell, a vehicle incorporating an electrochemical conversion assembly according to the present invention. Furthermore, variations on the terms "automobile", "automotive", "vehicular" or the like are meant to be construed generically unless the context dictates otherwise. As such, reference to an automobile will be understood to cover cars, trucks, buses, motorcycles and other similar modes of transportation unless more particularly recited in context.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A battery module for an automobile, said battery module comprising:
   a plurality of battery cells aligned along a stacking dimension to deliver electric current for motive power for said automobile;
   a plurality of frames aligned along said stacking dimension to support said plurality of battery cells and form a structural basis for said battery module;
   a plurality of cooling plates aligned along said stacking dimension each comprising a microencapsulated phase change material thereon;
   a plurality of cooling fins cooperative with one another along said stacking dimension to define at least one flowpath therethrough wherein at least a portion of said microencapsulated phase change material is disposed on a surface of said at least one flowpath; and
   at least one foam isolator sheet aligned along said stacking dimension and comprising said microencapsulated phase change material formed on an external surface thereof, wherein at least one of said plurality of cooling fins and said at least one foam isolator sheet are placed individually next to and on opposite sides of at least one of said plurality of battery cells in a stacked facing relationship with said plurality of battery cells such that together they define a generally planar profile along said stacking dimension thereof to maximize contact surface area and thermal communication with said plurality of battery cells such that upon exposure thereof to a temperature change in said plurality of battery cells said microencapsulated phase change material is capable of going through a phase change as a way to exchange heat with said plurality of battery cells.

2. The battery module of claim 1, wherein said microencapsulated phase change material comprises an outer shell with an inner core of material of high latent heat absorption encased within said shell.

3. The battery module of claim 2 wherein said core comprises eicosane.

4. The battery module of claim 3, wherein said shell comprises a polymeric-based material.

5. The battery module of claim 2, wherein a size of said microencapsulated phase change material is from between about 1 micron in diameter to about 100 microns in diameter.

6. The battery module of claim 2, wherein said material of high latent heat absorption may be in any of a sold, liquid or gaseous state at room temperature.

7. The battery module of claim 1, wherein said phase change corresponds to at least one of an endothermic reaction absorption of heat and an exothermic reaction release of heat.

8. The battery module of claim 1, wherein said microencapsulated phase change material comprises a low-temperature phase change material and a high-temperature phase change material such that said low-temperature phase change material is configured to experience a phase change from liquid to solid at a temperature of about 0° C., and further such that said high-temperature phase change material is configured to experience a phase change from solid to liquid at a temperature of about 40° C.

9. An automobile comprising:
   a portion for conveying at least one of a passenger, operator or cargo;
   a portion for engaging a surface upon which said automobile travels; and
   a propulsion portion for providing motive power to said surface-engaging portion, said propulsion portion comprising at least one battery module comprising:
      a plurality of battery cells aligned along a stacking dimension;
      a plurality of frames aligned along said stacking dimension to support said plurality of battery cells and form a structural basis for said at least one battery module;
      a plurality of cooling plates aligned along said stacking dimension each comprising a microencapsulated phase change material thereon;
      a plurality of cooling fins cooperative with one another along said stacking dimension to define at least one flowpath therethrough wherein at least a portion of said microencapsulated phase change material is disposed on a surface of said at least one flowpath; and
      at least one foam isolator sheet aligned along said stacking dimension and comprising said microencapsulated phase change material formed on an external surface thereof, wherein at least one of said plurality of cooling fins and said at least one foam isolator sheet are placed individually next to and on opposite sides of at least one of said plurality of battery cells in a stacked facing relationship with said plurality of battery cells such that together they define a generally planar profile along said stacking dimension thereof to maximize contact surface area and thermal communication with said plurality of battery cells such that upon exposure thereof to a temperature change in said plurality of battery cells said microencapsulated phase change material is capable of going through a phase change as a way to exchange heat with said plurality of battery cells.

10. The automobile of claim 9, wherein said microencapsulated phase change material comprises an outer shell with an inner core of material of high latent heat absorption encased within said shell.

11. The automobile of claim 10, wherein said microencapsulated phase change material comprises a low-temperature phase change material and a high-temperature phase change material such that said low-temperature phase change material is configured to experience a phase change from liquid to solid at a relatively low temperature, and further such that said high-temperature phase change material is configured to experience a phase change from solid to liquid at a relatively high temperature.

12. The battery module of claim 1, wherein said plurality of frames comprise a plurality of end frames and at least one repeating frame.

13. The battery module of claim 12, wherein said plurality of cooling plates are mounted to said plurality of end frames and comprising corrugated channels formed in a generally planar surface thereof.

* * * * *